United States Patent
Yamaguchi et al.

(10) Patent No.: US 6,647,202 B1
(45) Date of Patent: Nov. 11, 2003

(54) VIDEO SIGNAL REPRODUCING APPARATUS CAPABLE OF REPRODUCING BITSTREAMS AND VIDEO SIGNAL REPRODUCING METHOD

(75) Inventors: Ryoji Yamaguchi, Osaka (JP); Makoto Meiarashi, Osaka (JP); Masaru Iwasa, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/362,972

(22) Filed: Jul. 29, 1999

(30) Foreign Application Priority Data

Jul. 30, 1998 (JP) ............................................ 10-215214

(51) Int. Cl.⁷ ........................ H04N 5/783; H04N 5/781
(52) U.S. Cl. .............................. 386/68; 386/95; 386/98
(58) Field of Search ............................... 386/33, 39, 40, 386/45, 95, 98, 105–106, 111–112, 125–126, 68, 81, 82; H04N 5/76, 9/79, 5/781

(56) References Cited

U.S. PATENT DOCUMENTS 6,253,025 B1 * 6/2001 Kitamura et al. ............ 386/125
6,363,212 B1 * 3/2002 Fujinami et al. ............. 386/112
6,424,792 B1 * 7/2002 Tsukagoshi et al. .......... 386/98
6,438,315 B1 * 8/2002 Suzuki et al. ................. 386/125
6,442,334 B1 * 8/2002 Kawamura et al. .......... 386/125

FOREIGN PATENT DOCUMENTS

JP 10271466 A 10/1998
JP 11008833 A 1/1999

* cited by examiner

Primary Examiner—Thai Tran
(74) Attorney, Agent, or Firm—Renner, Otto, Boisselle & Sklar

(57) ABSTRACT

A video signal reproduction apparatus is provided for reproducing a multiplexed encoded stream including audio data, video data, sub-picture data, and additional information digitally encoded and multiplexed on a packet-by-packet basis. The multiplexed encoded stream includes a plurality of packs, each of the plurality of packs including at least one packet, the at least one packet including a packet header and packet encoded data. The packet encoded data includes at least one of packet audio encoded data, packet video encoded data, packet sub-picture encoded data, and packet navigation encoded data. The packet audio encoded data forms sub-picture encoded data, the sub-picture encoded data including a first reproduction unit and a second reproduction unit. The first reproduction unit includes a first unit header, first encoded bit map data, and first display control information, and the second reproduction unit includes a second unit header, second encoded bit map data, and second display control information. The video signal reproduction apparatus includes: an input processing section for adding a next-sub-picture reproduction unit pointer to the first reproduction unit; and a sub-picture decoder for decoding the sub-picture encoded data based on the next-sub-picture reproduction unit pointer added to the first reproduction unit.

14 Claims, 9 Drawing Sheets

Pack / packet structure

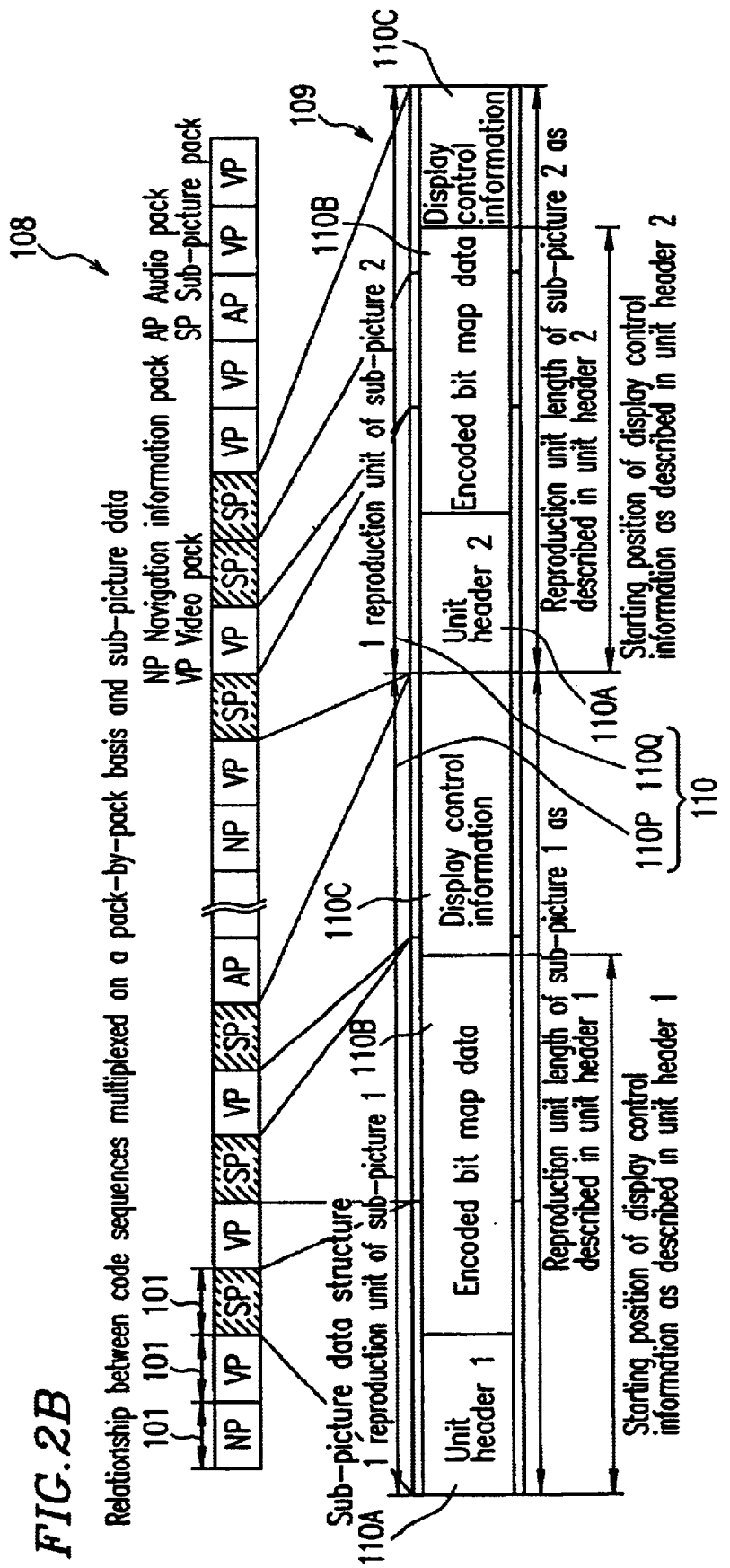

VIDEO SIGNAL REPRODUCING APPARATUS CAPABLE OF REPRODUCING BITSTREAMS AND VIDEO SIGNAL REPRODUCING METHOD

BACKGROUND OF THE INVENTION

1. Field of the Invention

The present invention relates to a video signal reproduction apparatus which is capable of reproducing bitstreams containing audio data, video data, sub-picture data, and additional information which are digitally encoded by an encoding technique (e.g., MPEG) and multiplexed on a pack-by-pack or packet-by-packet basis.

2. Description of the Related Art

Recent years have seen a rapid and wide spread of media capable of accommodating video signals, audio signals, and additional information (e.g., subtitle information) in a digitally encoded and multiplexed format. One example of such media is the DVD (digital video disk).

Reproduction apparatuses for such multiplexed digital signals are associated with the following problems, which may hinder the smooth and normal operation of the reproduction apparatus: input of non-continuous and inconstant bitstreams during a special reproduction mode (such as a forward skip or a backward skip, which may occur without continuous data input); generation of errors at the time of encoding; generation of errors due to damaged disks or noises present on a transmission path; and the like.

On the other hand, the reproducing of audio, video, and sub-picture data generally requires synchronization. If the bitstream has been encoded with a tendency toward underflowing, it is possible that, when skipping sub-picture data by reproduction units, reproduced data may not be complete, thereby hindering proper reproduction.

In the field of digital media, video signals are generally subjected to an encoding scheme that complies with the MPEG standards, while encoding schemes other than MPEG-compatible schemes may be adopted for audio signals. A special bit map data compression technique is adopted for the encoding of subtitles carried on DVDs. The multiplexing of encoded audio or video data is performed by a multiplexing method which complies with the MPEG system standards.

FIGS. 2A and 2B illustrate code sequences which are multiplexed on the basis of packets 102. FIG. 2A illustrates the structure of a pack 101 as a basic unit of multiplexing. At the beginning of a packet 102, a packet header 107B is added which includes a synchronization signal (hereinafter referred to as a "packet start code prefix") 103 indicating the top or beginning of the packet, a packet identifier (stream_id) 104 for distinguishing video packets from audio packets, packet length information 105, and video/audio synchronization reproduction information 106. Although FIG. 2A illustrates an example where the pack 101 includes one packet 102, the pack 101 may alternatively include a plurality of packets 102.

FIG. 2B illustrates an exemplary structure of a multiplexed code sequence 108 and sub-picture encoded data 109. The multiplexed code sequence 108 contains audio packs AP, video packs VP, sub-picture packs SP, and navigation information encoded data packs NP. The audio signal, the video signal, the sub-picture signal, and the navigation information are respectively digitally encoded by an encoder, and multiplexed by a multiplexer on a pack-by-pack basis.

The sub-picture encoded data 109 in FIG. 2B is shown as only including the sub-picture encoded data of the sub-picture packs SP extracted from the multiplexed code sequence 108 and combined together. An shown in FIG. 2B, each reproduction unit 110P and 110Q of the sub-picture encoded data 109 includes a unit header 110A, an encoded bit map data 110B, and display control information 110C corresponding to the bit map data 110B.

Conventionally, the sub-picture encoded data 109 is reproduced by analyzing the unit header 110A at the beginning of the reproduction unit 110P or 110Q, decoding the encoded bit map data 110B by using the information described in the unit header 110P or 110Q, performing display control functions (such as setting the output timing or adjusting color changes by using the display control information 110C for the decoded bit map data 110B), and blending the decoded bit map data 110B with the video reproduction signal for output. The transition from the reproduction unit 110P to the reproduction unit 110Q is achieved by moving the reproduction position to the beginning of the reproduction unit 110Q in accordance with a reproduction unit length described in the unit header 110A, and consecutively performing reproduction.

Conventionally, the beginning of the reproduction unit 110P of any viable sub-picture encoded data 109 (that is free of errors and the like) may be detected by relying on the reproduction unit length described in the unit header 110A; and the reproduction unit length is used for reproducing the sub-picture encoded data 109. The illustrated sub-picture encoded data 109 does not itself include a synchronization pattern. Rather, the beginning of the reproduction unit 110P of the sub-picture encoded data 109 starts with the unit header 110A. The unit header 110A cannot be detected by encoded data matching based on a synchronization pattern, as would be performed for video or audio data.

Even if the reproduction unit length described in the unit header 110A includes an error for some reason, it may still be possible to continue reproducing some or all of the reproduction unit 110P that is associated with the wrong reproduction unit length. However, the erroneous reproduction unit length makes it difficult to properly move the reproduction position to the beginning of the next reproduction unit 110Q. Therefore, the unit header 110A in the reproduction unit 110Q cannot be detected. Since it is difficult to decode the reproduction unit 110Q, a sub-picture decoder used for decoding the sub-picture encoded data 109 may hang up. Thus, if an error is present in the unit header 110A, it becomes difficult to smoothly reproduce the sub-picture encoded data 109.

FIGS. 3A and 3B illustrate a data transfer scheme in a special reproduction mode. In FIG. 3A, sub-picture packs SPU1_1, SPU1_2, and SPU1_3 correspond to the reproduction unit 110Q of the sub-picture encoded data 109: and sub-picture packs SPU2_1, SPU2_2, and SPU2_3 correspond to the reproduction unit 110P of the sub-picture encoded data 109. In the continuous multiplexed code sequence 108A shown in FIGS. 3A and 3B, if a pack within a period DT1 and a pack within a period DT2 are reproduced in an intermittent manner in a special reproduction mode, the reproduction unit 110P for the sub-picture data will not be completed, and the sub-picture packs SPU1_1 and SPU1_2 and the sub-picture pack SPU2_1 in the next reproduction unit 110Q will be combined into, and processed as, decoded date 111 as shown in FIG. 3B.

The sub-picture encoded data 109 is reproduced in such a manner that any data present in the uncompleted sub-picture reproduction unit 110P is reproduced based on the reproduction unit length described in the unit header 110A (which is included at the beginning of the reproduction unit 110P).

FIG. 4 illustrates the reproduction of the sub-picture encoded data 109 during intermittent reproduction. A decoding operation is performed so as to first reproduce the reproduction unit 110P by extracting the reproduction unit length described in the unit header 110A, reproducing the reproduction unit 110P, and then reproducing the next reproduction unit 110Q by commencing a reproduction operation from a position which is distant from the reproduction unit 110P by the specified reproduction unit length 113.

However, as shown In FIG. 4, the reproduction unit length 113 may not be equal to the actual data length of a reproduction unit 113A which is stored in a sub-picture bit buffer 13. Since the actual data length of a reproduction unit 113A which is stored in a sub-picture bit buffer 13 is smaller than the reproduction unit length 113, the decoding operation could be continued past the data portion in the reproduction unit 110P, and over to the data portion in the reproduction unit 110Q. However, since any data in the reproduction unit 110Q is not the data in the reproduction unit 110P, it is impossible to continue a normal reproduction operation. In fact, depending on the content of the reproduction unit 110Q, which has been reproduced as if it were the reproduction unit 110P, abnormal reproduction control may be performed so as to result in outputting an inappropriate reproduction signal as reproduction data; or the reproduction operation itself may even come to a halt.

If the specific content of the data in the reproduction unit 110P happens to be decodable, then the sub-picture decoder will begin reproducing the next reproduction unit 110Q. However, since the sub-picture decoder will rely on the wrong reproduction unit length 113 from the reproduction unit 110P, the sub-picture decoder will commence reproduction from midway, rather than the exact beginning, of the reproduction unit 110Q. As a result, the reproduction of the sub-picture data in the reproduction unit 110Q will similarly result in an abnormal operation, again causing malfunctioning of the sub-picture decoder. This would result in outputting an inappropriate reproduction signal as reproduction data, or the reproduction operation itself might even come to a halt. In the case where the reproduction operation stops, the reproduction apparatus must be reset in order to resume a decoding operation.

Usually, detection of a hang-up is time-consuming, and the particular input sub-picture data which was being reproduced is usually lost, thereby hindering smooth reproduction.

The abnormal operation of the sub-picture decoder due to abnormality of sub-picture data may occur not only at the time of intermittent data inputting during a special reproduction mode, but also in a case where the reproduction unit length does not match the length of the actual reproduction data due to an error associated with encoding or an error that is present on a transmission path.

As described above, the conventional techniques have a problem in that a sub-picture decoder has difficulties in performing continuous reproduction of sub-picture data during a special reproduction mode or in the presence of errors associated with encoding, errors due to damaged disks, or errors due to noise on a transmission path.

SUMMARY OF THE INVENTION

In one aspect of the present invention, there is provided a video signal reproduction apparatus for reproducing a multiplexed encoded stream including audio data, video data, sub-picture data, and additional information digitally encoded and multiplexed on a packet-by-packet basis, wherein the multiplexed encoded stream includes a plurality of packs, each of the plurality of packs including at least one packet, the at least one packet including a packet header and packet encoded data; and wherein the packet encoded data includes at least one of packet audio encoded data, packet video encoded data, packet sub-picture encoded data, and packet navigation encoded data; wherein the packet audio encoded data forms sub-picture encoded data, the sub-picture encoded data including a first reproduction unit and a second reproduction unit; the first reproduction unit including a first unit header, first encoded bit map data, and first display control information; and the second reproduction unit including a second unit header, second encoded bit map data, and second display control information, wherein the video signal reproduction apparatus includes: an input processing section for adding a next-sub-picture reproduction unit pointer to the first reproduction unit; and a sub-picture decoder for decoding the sub-picture encoded data based on the next-sub-picture reproduction unit pointer added to the first reproduction unit.

In one embodiment of the invention, the input processing section adds the next-sub-picture reproduction unit pointer to the beginning of the first reproduction unit.

In another embodiment of the invention, the input processing section adds the next-sub-picture reproduction unit pointer immediately after the first unit header.

In still another embodiment of the invention, the input processing section includes: a stream separation section for detecting the beginning of the first reproduction unit; and a stream transfer control section for adding dummy data to the first reproduction unit.

In still another embodiment of the invention, the stream transfer control section includes: a dummy data insertion section for adding the dummy data to the first reproduction unit; a data transfer section for transferring the first reproduction unit, to which the dummy data has been added; and an input reproduction unit length measuring section for counting the number of data in the first reproduction unit which has been transferred by the data transfer section, wherein the data transfer section overwrites the next-sub-picture reproduction unit pointer to replace the dummy data based on the number of data as counted by the input reproduction unit length measuring section.

In still another embodiment of the invention, the video signal reproduction apparatus further includes a sub-picture buffer for storing the first reproduction unit, to which the next-sub-picture reproduction unit pointer has been added by the input processing section, wherein the sub-picture decoder decodes the sub-picture encoded data stored in the sub-picture buffer.

In another aspect of the invention, there is provided a video signal reproduction method for reproducing a bitstream including audio data, video data, sub-picture data, and additional information digitally encoded and multiplexed on a packet-by-packet basis, wherein the multiplexed encoded stream includes a plurality of packs, each of the plurality of packs including at least one packet, the at least one packet including a packet header and packet encoded data; and wherein the packet encoded data includes at least one of packet audio encoded data, packet video encoded data, packet sub-picture encoded data, and packet navigation encoded data; wherein the packet audio encoded data forms sub-picture encoded data, the sub-picture encoded data including a first reproduction unit and a second reproduction unit down stream from the first reproduction unit; the first reproduction unit including a first unit header, first encoded bit map data, and first display control information; and the second reproduction unit including a second unit header, second encoded bit map data, and second display control information, wherein the method includes: a first step of adding a next-sub-picture reproduction unit pointer to the first reproduction unit; and a second step of decoding the sub-picture encoded data by using the next-sub-picture reproduction unit pointer.

In one embodiment of the invention, the first step includes adding the next-sub-picture reproduction unit pointer to the beginning of the first reproduction unit.

In another embodiment of the invention, the first step includes adding the next-sub-picture reproduction unit pointer immediately after the first unit header.

In still another embodiment of the invention, the first step includes adding the next-sub-picture reproduction unit pointer to the first reproduction unit during a special reproduction mode involving intermittent data input.

In still another embodiment of the invention, the first unit header contains a unit header length representing a reproduction unit length which is added when the packet sub-picture encoded data is encoded, and the second step includes using the next-sub-picture reproduction unit pointer with a priority over the unit header length.

In still another embodiment of the invention, the second step includes: determining an input data error in a case where the next-sub-picture reproduction unit pointer does not coincide with the unit header length, and decoding the second reproduction unit by detecting the beginning of the second reproduction unit by using the next-sub-picture reproduction unit pointer.

In still another embodiment of the invention, the second step includes skipping to the second reproduction unit based on the next-sub-picture reproduction unit pointer.

In still another embodiment of the invention, the second step includes, in a case where the first display control information includes valid first display control information, decoding the first reproduction unit based on the valid first display control information.

In accordance with one aspect of the invention, a sub-picture decoder can utilize the actual reproduction unit length of input sub-picture encoded data, instead of a specified reproduction unit length of sub-picture data which may have been destroyed by errors of the like. As a result, the sub-picture decoder can always know the accurate unit header position which marks the beginning of a reproduction unit of sub-picture encoded data.

In accordance with another aspect of the invention, the reliability of sub-picture encoded data reproduction in an inconstant state can be improved, e.g., during a special reproduction mode or in the presence of errors.

Thus, the invention described herein makes possible the advantages of (1) providing a video signal reproduction apparatus and a reproduction method which are capable of performing proper reproduction, without hanging up, in a special reproduction mode during which intermittent data may be input, or in the presence of errors generated at the time of encoding, errors due to damaged disks, and/or errors generated due to noise on a transmission path; and (2) providing a video signal reproduction apparatus and a reproduction method which are capable of decoding at least a reproducible portion of sub-picture data in a special reproduction mode during which intermittent data may be input, or in the presence of errors generated at the time of encoding, errors due to damaged disks, and/or errors generated due to noise on a transmission path.

These and other advantages of the present invention will become apparent to those skilled in the art upon reading and understanding the following detailed description with reference to the accompanying figures.

BRIEF DESCRIPTION OF THE DRAWINGS

FIG. 2B is a diagram illustrating a multiplexed encoded signal and sub-picture data.

DESCRIPTION OF THE PREFERRED EMBODIMENTS

Example 1

Figure 1:
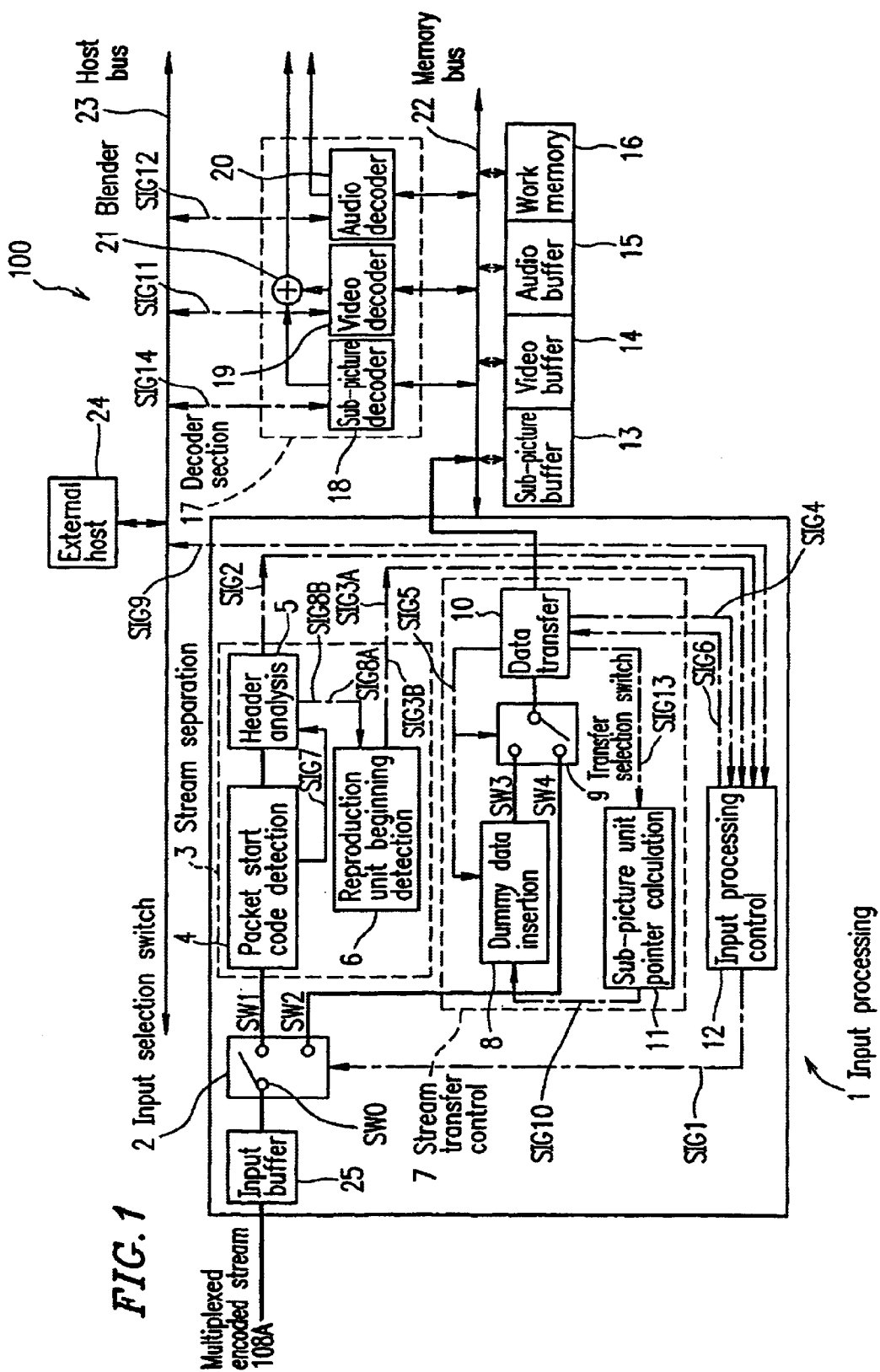
FIG. 1 is a block diagram illustrating a video signal reproduction apparatus according to Example 1 of the present invention.
Figure 3A:
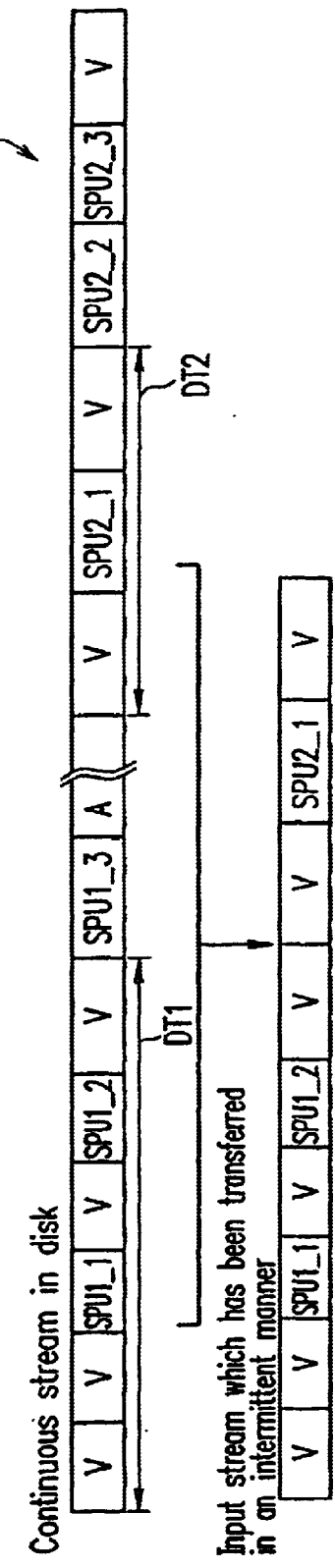
FIG. 3A is a diagram illustrating a data transfer occurring in a special reproduction mode.
Figure 3B:
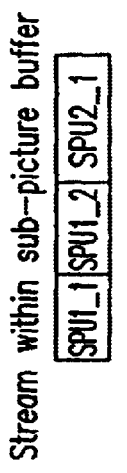
FIG. 3B is a diagram illustrating a data transfer occurring in a special reproduction mode, where only the sub-picture packets in FIG. 3A are shown.
Figure 4:
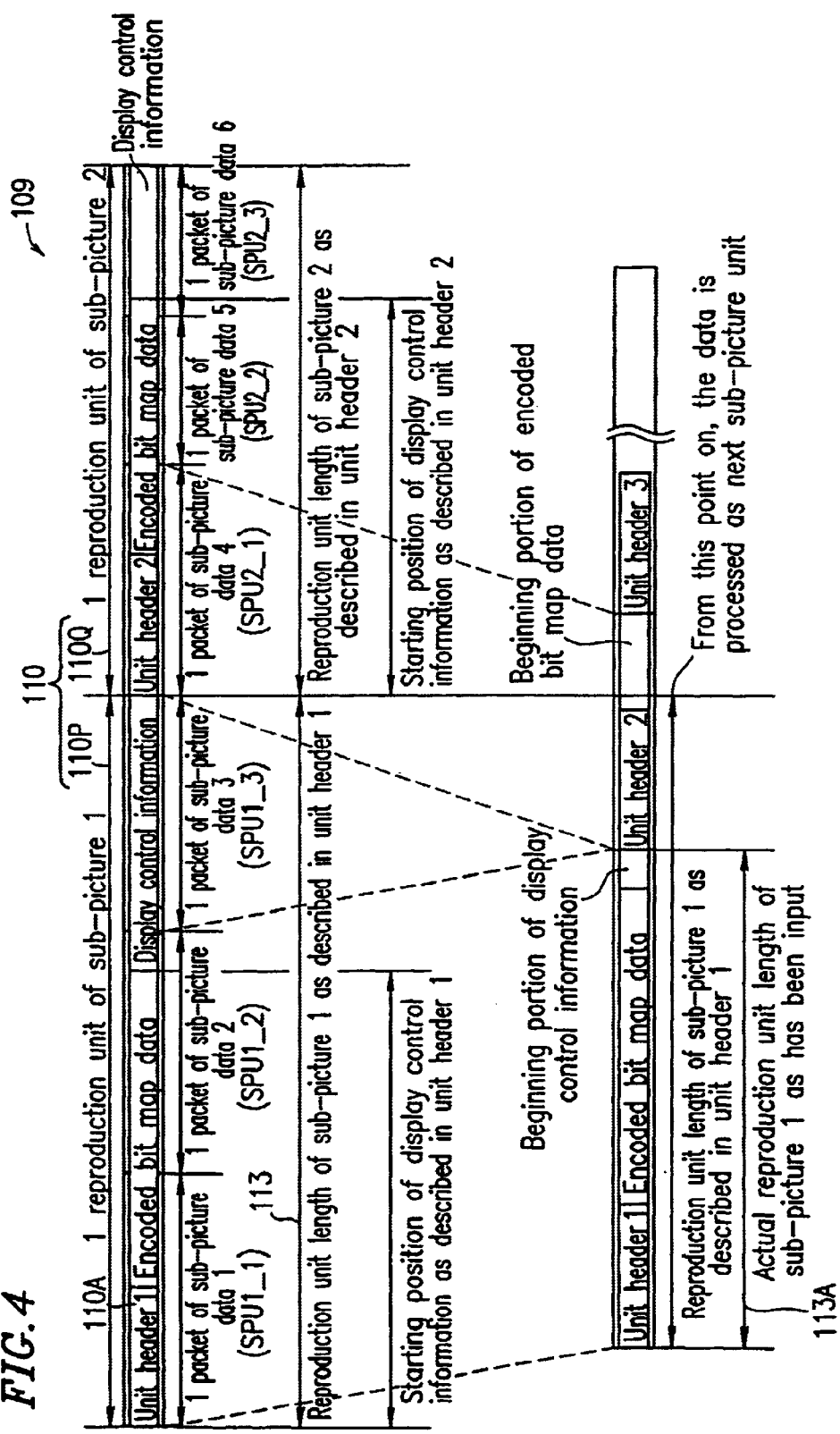
FIG. 4 is a diagram illustrating the reproduction of sub-picture data occurring during intermittent reproduction.

FIG. 1 is a block diagram illustrating a video signal reproduction apparatus 100 according to Example 1 of the present invention. FIGS. 3A and 3B illustrate a bitstream to be reproduced according to the present example, which is input in an intermittent manner during a special reproduction mode.

The video signal reproduction apparatus 100 shown in FIG. 1 reproduces a multiplexed encoded bitstream 108A containing audio data, video data, sub-picture data, additional information, etc., which are digitally encoded and multiplexed on a packet-by-packet basis.

An input processing section 1 adds reproduction control information, i.e., a next-sub-picture reproduction unit pointer (described later), to the beginning of each reproduction unit 110P or 110Q (FIG. 2B). Alternatively, the input processing section 1 may be arranged so as to add reproduction control information immediately after the identifier (unit header 110A) at the beginning.

First, the functions of respective component elements of the input processing section 1, e.g., an input buffer 25, an input selection switch 2, a stream separation section 3, a stream transfer control section 7, and an input processing control section 12, will be described with reference to the flows of input/output signals. Thereafter, the internal structure of each element will be specifically described.

The multiplexed encoded stream 108A which has been input to the video signal reproduction apparatus 100 is temporarily stored in the input buffer 25. The input buffer 25 for temporarily storing the multiplexed encoded stream 108A which has been input to the video signal reproduction apparatus 100 smoothes out the data speed of the input multiplexed encoded stream 108A and supplies the data to the two subsequent elements, i.e., the stream separation section 3 and the stream transfer control section 7. The stream separation section 3 and the stream transfer control section 7, which are provided after the input buffer 25, have a sufficiently fast processing ability relative to the data rate of the supplied multiplexed encoded stream 108A.

The input selection switch 2 is a switch for selectively inputting the multiplexed encoded stream 108A from the input buffer 25 to either the stream separation section 3 or the stream transfer control section 7. Specifically, a terminal SW0 of the input selection switch 2 is coupled to a terminal SW1 during analysis of a pack header 107A and a packet header 107B (FIG. 2A) contained in each pack 101 of the multiplexed encoded stream 108A. The terminal SW0 to coupled to a terminal SW2 while the stream transfer control section 7 stores encoded data 107C contained in each packet 102 into either a sub-picture buffer 13, a video buffer 14, or an audio buffer 15 depending on the content of the encoded data. The switching between the terminals SW1 and SW2 occurs in accordance with a signal SIG1 which is issued from the input processing control section 12.

The stream separation section 3, which is a block for controlling separation of the multiplexed encoded stream 108A into respective components, analyzes the multiplexed encoded stream 108A which is supplied from the input buffer 25 via the terminal SW1. A packet start code detection section 4 detects the beginning of the pack 101 from the multiplexed encoded stream 108A. A header analysis section 5 analyzes the pack header 107A and the packet header 107B so as to extract the control information which is necessary for the reproduction of the encoded data 107C.

Once the analysis of the packet header 107B is completed, the header analysis section 5 sends a header analysis signal (SIG2) to the input processing control section 12. At this time, a reproduction unit beginning detection section 6 sends a data attribute signal (SIG3A) to the input processing control section 12 for indicating whether the encoded data 107C contained in the packet 102 for which analysis has been completed is video data, audio data, or sub-picture data. The stream transfer control section 7 sends the signal SIG2 to the input processing control section 12 for indicating the effective encoded data length within the packet 102 that is necessary at the time of data transfer.

The stream transfer control section 7 is activated by a signal SIG6 from the input processing control section 12. After the header analysis by the stream separation section 3 is completed, the input selection switch 2 is switched in accordance with the signal SIG1 so as to conduct between the terminals SW0 and SW2, so that the multiplexed encoded stream 108A is input to the stream transfer control section 7. The respective components of the multiplexed encoded stream 108A which is input via the terminal SW2 are transferred to the sub-picture buffer 13, the video buffer 14, or the audio buffer 15 via a memory bus 22, in accordance with the data attribute signal and the effective encoded data length which are set in accordance with the signal SIG6 from the input processing control section 12 at the time of activation. The input processing control section 12 informs, via the signal SIG6, the stream transfer control section 7 of the effective encoded data length to be transferred.

The input processing control section 12 is a central control block of the input processing section 1 for controlling the input selection switch 2, the stream separation section 3, and the stream transfer control section 7. The input processing control section 12 sends a signal SIG9 via a host bus 23 to communicate with an external host 24.

Thus, the essential functional blocks of the input processing section 1, i.e., the input buffer 25, the input selection switch 2, the stream separation section 3, the stream transfer control section 7, and the input processing control section 12, have been briefly described.

Next, the internal structure of the stream separation section 3 and the stream transfer control section 7 will be specifically described.

First, the internal structure of the stream separation section 3 will be described. The stream separation section 3 includes the packet start code detection section 4, the header analysis section 5, and the reproduction unit beginning detection section 6. The packet start code detection section 4 is activated by the input processing control section 12 and reads out the multiplexed encoded stream 108A (which is input via the terminal SW1) from pack to pack. The data length which is read out is usually 1 byte; however, any other data length can be used instead of 1 byte.

Upon detecting the pack header 107A and a packet start code prefix 103 (FIG. 2A), the packet start code detection section 4 activates the header analysis section 5 with a signal SIG7. The signal SIG7 contains a packet attribute signal for identifying the type of the packet.

Figure 2A:
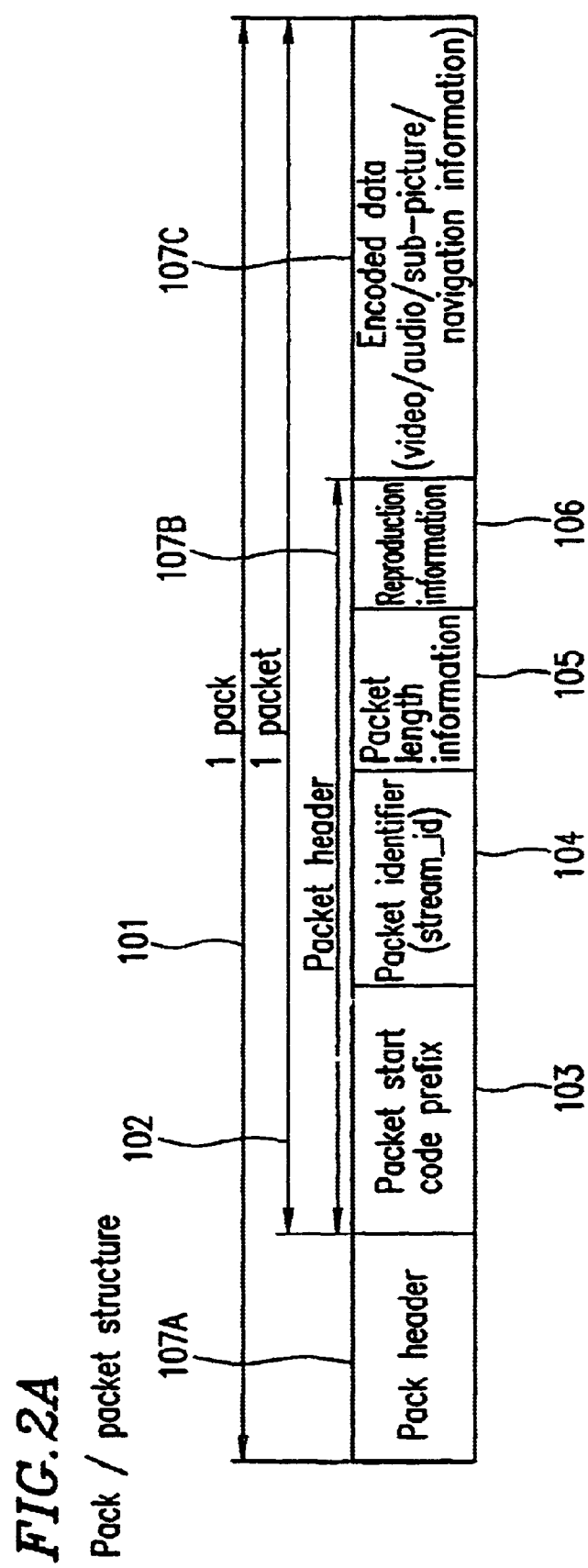
FIG. 2A is a diagram illustrating the structure of a pack and a packet.

The packet start code detection section 4 supplies the multiplexed encoded stream 108A (which is input via the terminal SW1) to the header analysis section 5. The header analysis section 5, which has been activated by the signal SIG7, analyzes the pack 101 and the packet 102. The header analysis section 5 extracts reproduction time information 106, etc., which is necessary for reproducing the multiplexed encoded stream 108A from within the packet header 107B (FIG. 2A). After extracting the reproduction time information, the header analysis section 5 sends a reproduction time information valid signal (signal SIG8A) to the reproduction unit beginning detection section 6.

In the case of a DVD standards-compatible stream, the header analysis section 5 analyzes the packet 102 up to the identifier (stream_id) at the beginning of the encoded data 107C. Upon completing the header analysis, the header analysis section 5 sends the signal SIG2 to the input processing control section 12, thereby indicating the completion of header analysis and sending a data attribute signal for identifying the type of the encoded data 107C that is contained in the packet 102 for which header analysis has been completed.

If the packet 102 to be processed is determined as a sub-picture packet through the analysis by the header analysis section 5, the header analysis section 5 sends a sub-picture packet analysis signal (signal SIG8B) to the reproduction unit beginning detection section 6. The reproduction unit beginning detection section 6 detects that the beginning of the sub-picture reproduction unit is included in the sub-picture packet based on the reproduction time information valid signal (SIG8A) and the sub-picture packet analysis signal (SIG8B), and sends a reproduction unit beginning detection signal for the sub-picture (SIG3B) to the input processing control section 12.

In the case of any DVD standards-compatible sub-picture packet 102 that contains the reproduction time information 106 (or PTS: presentation time stamp), the beginning data of the sub-picture reproduction unit is included in the beginning of the encoded data 107C. Therefore, the reproduction unit beginning detection section 6 can detect the beginning of a packet 102 that contains sub-picture encoded data based on the signals SIG8 (including a reproduction time information valid signal SIG8A and a sub-picture packet analysis signal SIG8B). Thus, the detailed internal structure of the stream separation section 3 has been described.

Next, the internal structure of the stream transfer control section 7 will be described. After completion of the analysis of the packet header 107B by the header analysis section 5, the stream transfer control section 7 extracts the sub-picture encoded data 107C contained in the packet 102. According to the present invention, not only is the sub-picture encoded data 107C extracted, but also a further processing is applied to the sub-picture encoded data 107C.

The data transfer section 10, which has been activated by the signal SIG6 (including a data attribute signal and an effective encoded data length) issued from the input processing control section 12, controls the switching of the transfer selection switch 9 with the signal SIG5, depending on whether or not the data corresponds to the beginning of the reproduction unit 110P of sub-picture data. If the data does not correspond to the beginning of the reproduction unit 110P of sub-picture data, the data transfer section 10 controls the transfer selection switch 9 so that a terminal SW4 becomes conductive. As a result, the sub-picture encoded data from the input buffer 25 (via the terminal SW2) is read, and the data transfer section 10 transfers the sub-picture encoded data 107C to the sub-picture buffer 13, the video buffer 14, and the audio buffer 15 via the memory bus 22, based on the data attribute signal and the effective encoded data length.

Upon receiving the signal (SIG6) indicating the beginning of the sub-picture reproduction unit 110P from the input processing control section 12, the data transfer section 10 controls the transfer selection switch 9 with the signal SIG5 so that a terminal SW3 becomes conductive for inserting dummy data at the beginning of the sub-picture reproduction unit 110P. The signal SIG5 is also input to the dummy data insertion section 8, whereby the dummy data insertion section 8 begins to output a predetermined length of dummy data.

The dummy data is also input to the data transfer section 10 via the terminal SW3 so as to be transferred to the sub-picture buffer 13 via the memory bus 22. Upon completion of the transfer of the dummy data, the data transfer section 10 controls the transfer selection switch 9 with the signal SIG5 so that the terminal SW4 becomes conductive for transferring the data (up to the end of the sub-picture packet 102) to the sub-picture buffer 13.

The data transfer section 10 informs a sub-picture unit pointer calculation section (input reproduction unit length measuring section) 11 of the data transfer length with a signal SIG13 for every 1 byte of encoded data 107C of the sub-picture packet 102 being transferred. Activated by the input processing control section 12 so as to transfer the next sub-picture data (including the beginning of the reproduction unit 110Q), the data transfer section 10 informs the sub-picture unit pointer calculation section 11 with the signal SIG13 that the transfer of the sub-picture reproduction unit 110P has been completed, and controls the transfer selection switch 9 so that the terminal SW3 becomes conductive. The sub-picture unit pointer calculation section 11 sends the total transfer length, which has been calculated from the beginning of the sub-picture reproduction unit 110P on a packet-by-packet basis, as a next-sub-picture reproduction unit pointer length to the dummy data insertion section 8 via a signal SIG10.

The dummy data insertion section 6 sends the received next-sub-picture reproduction unit pointer length to the data transfer section 10 via the terminal SW3. The data transfer section 10 overwrites the next-sub-picture reproduction unit pointer length in a dummy data region of the sub-picture buffer 13. Once the dummy data has been overwritten, the dummy data insertion section 8 begins another process of inserting dummy data at the beginning of the newly detected sub-picture reproduction unit 110Q. Thus, the internal structure of the stream transfer control section 7 has been described.

In addition to the above-described elements for input processing, the video signal reproduction apparatus 100 according to the present example further includes a decoder section 17 for reproducing the encoded data 107C which has been separated by the input processing section 1, the sub-picture buffer 13, the video buffer 14, the audio buffer 15, a work memory 16, the host bus 23, and the external host 24. The sub-picture, video, and audio encoded data 107C which have been separated by the input processing section 1 after removing the packet header 107B are respectively stored in the sub-picture buffer 13, the video buffer 14, and the audio buffer 15.

The encoded data 107C stored in the respective buffers are read and decoded by a sub-picture decoder 18, a video decoder 19, and an audio decoder 20 which are included in the decoder section 17. The respective decoders 18, 19, and 20 utilize the work memory 16 for performing the decoding operation. The decoded sub-picture signal and video signal are synthesized by a blender 21 so as to be output as a video output signal to devices external to the reproduction apparatus. The reproduction results by the audio decoder 20 are output as audio output signals to devices external to the reproduction apparatus 100.

The external host 24 controls the initial settings and any changes in the settings during reproduction in the input processing section 1 and the decoder section 17 via signals SIG9, SIG11, SIG12, and SIG14 on the host bus 23.

Thus, the functional blocks of the reproduction apparatus 100 according to the present example of the invention have been described above.

Hereinafter, an operation involving the respective functional blocks will be specifically described with respect to the input processing section 1 and the sub-picture decoder 18.

(Input Processing Operation)

Figure 5:
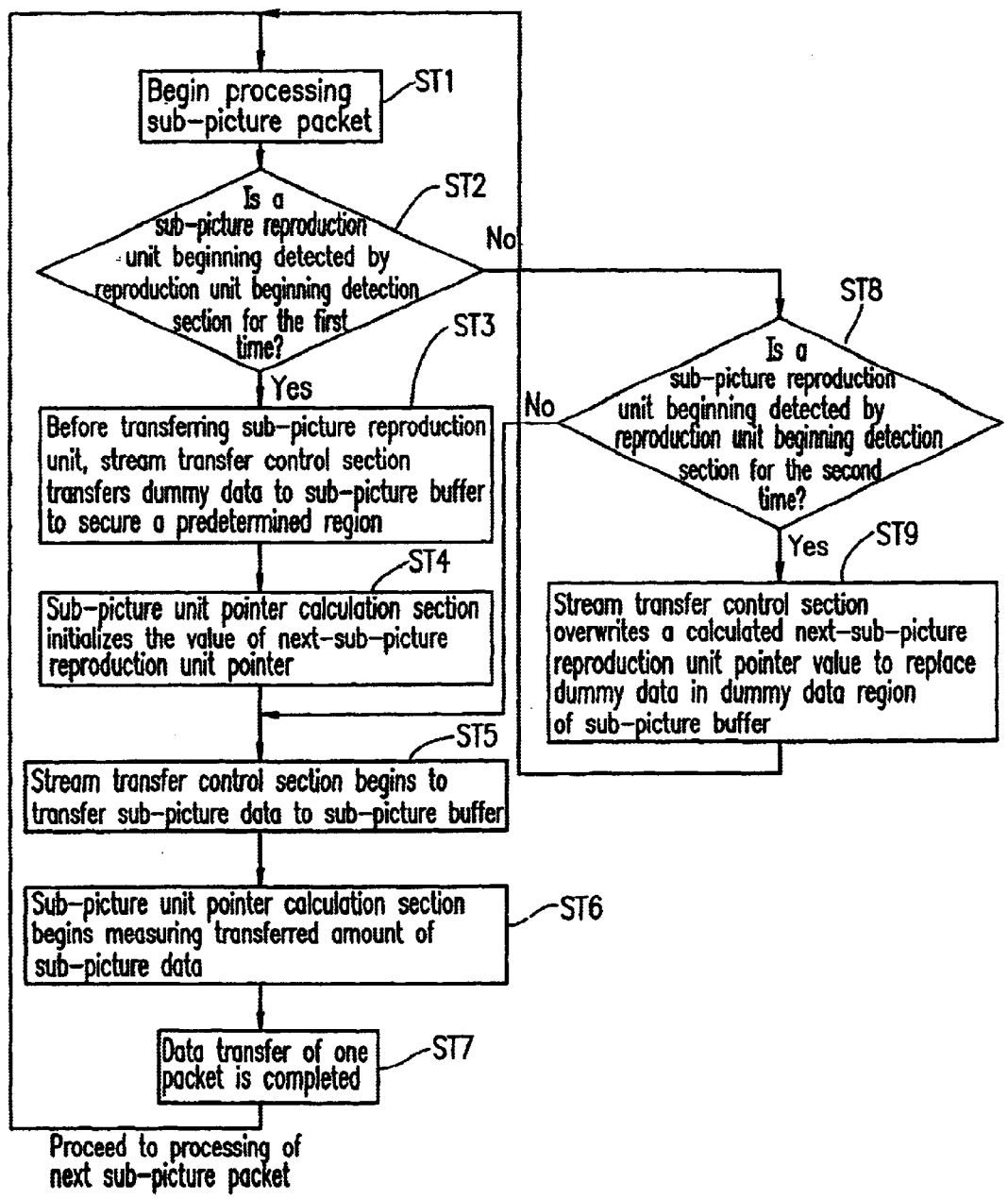
FIG. 5 is a flowchart illustrating an operation of an input processing section according to Example 1 of the present invention.
Figure 7:
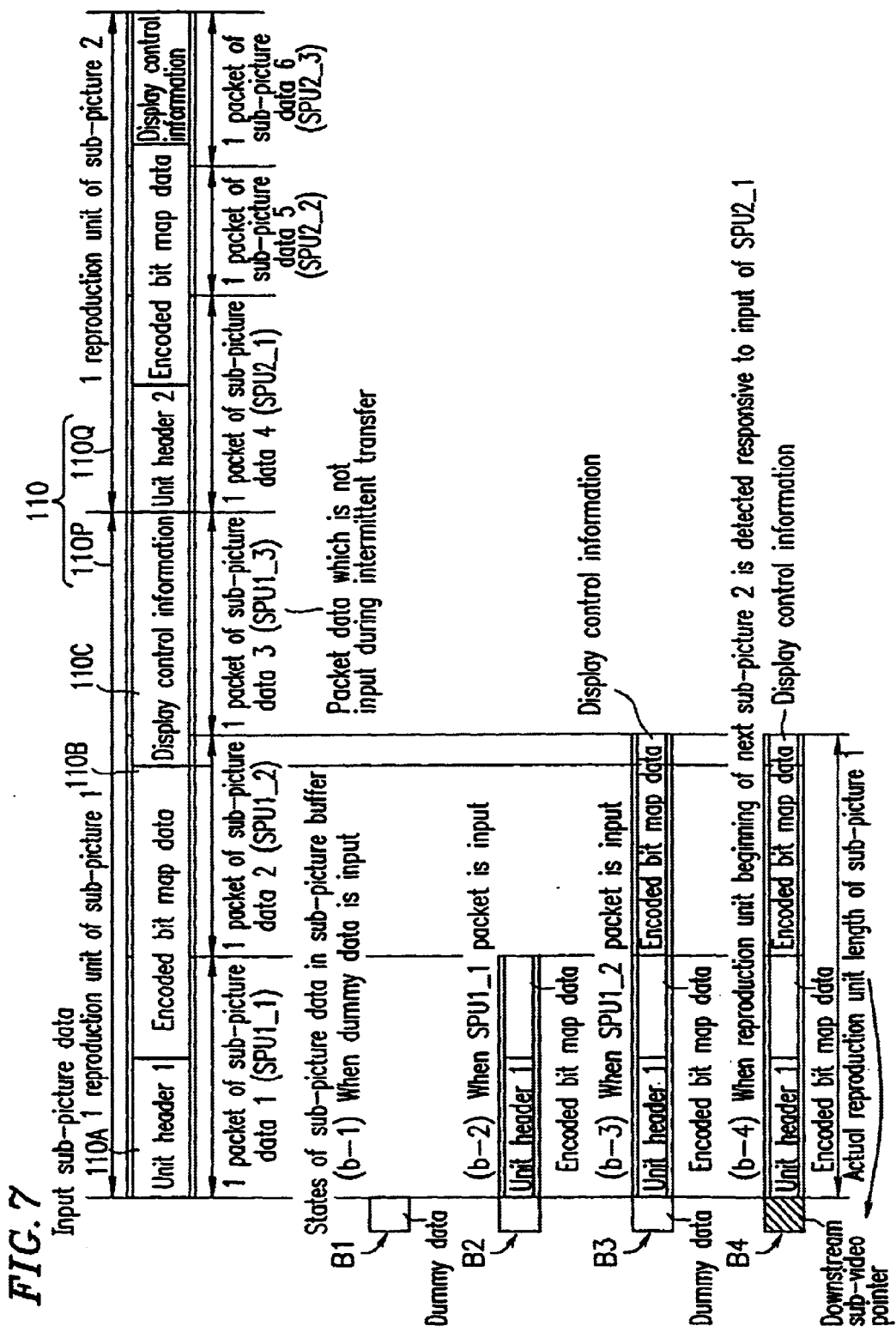
FIG. 7 is a diagram illustrating an operation of adding a next-sub-picture reproduction unit pointer during intermittent reproduction according to Example 1 of the present invention.

FIG. 5 is a flowchart illustrating an operation of an input processing section according to Example 1 of the present invention. The following description will be based on the flowchart of FIG. 5. FIG. 7 is a diagram illustrating an operation of adding a next-sub-picture reproduction unit pointer during intermittent reproduction of sub-picture data according to the present example of the invention.

At the start of the inputting of a multiplexed encoded stream 108A, the input selection switch 2 conducts between the terminals SW0 and SW1. The input multiplexed encoded stream 108A is input to the input processing section 1 of the video signal reproduction apparatus 100. The packet start code detection section 4 in the stream separation section 3 determines whether a packet 102 in the multiplexed encoded stream 108A contains audio encoded data, video encoded data, sub-picture encoded data, or additional information.

At step ST1, upon detecting a sub-picture packet SPU1_1, the input processing section 1 begins processing the packet SPU1_1. Upon detecting the packet SPU1_1, the packet start code detection section 4 informs the detection to the reproduction unit beginning detection section 6. Accordingly, the header analysis section 5 is activated so as to analyze a packet header 107B of the above encoded data to extract reproduction time information and the like which are necessary for the reproduction operation upon detecting reproduction time information, the header analysis section 5 informs the detection to the reproduction unit beginning detection section 6.

At step ST2, based on the sub-picture packet as informed by the packet start code detection section 4 and the presence of reproduction time information as informed by the header analysis section 5, the reproduction unit beginning detection section 6 determines that the packet SPU1_1 includes the beginning data of a reproduction unit 110P. In the case of a DVD-compatible data stream, the beginning of the reproduction unit 110P included in the packet SPU1_1 is characterized by the presence of display time information that is added in its packet header 107B. Therefore, the beginning of the reproduction unit 110P within the packet SPU1_1 can be detected based on the presence of display time information (PTS) in the packet header of sub-picture packet.

If the packet SPU1_1 includes the beginning data of the reproduction unit 110P, the control proceeds to step ST3, where the transfer selection switch 9 is controlled so that the terminal SW3 becomes conductive, and the dummy data insertion section 8 in the stream transfer control section 7 inserts dummy data in order to secure a predetermined region to be subsequently overwritten (described later). The data transfer section 10 transfers the dummy data which has been inserted by the dummy data insertion section 8 to the sub-picture buffer 13. The data transfer section 10 stores the top address of the dummy data within the sub-picture buffer 13. At this point, the sub-picture buffer 13 has a state B1 as illustrated in FIG. 7. Once the transfer of the dummy data is completed, the transfer selection switch 2 is controlled so that the terminal SW2 becomes conductive. As the dummy data for insertion at the beginning of the reproduction unit of video encoded data by the dummy data insertion section 8, any data can be adopted that has a pattern which will not be confused with the next-sub-picture reproduction unit pointer value used to overwrite the dummy data with.

After the transfer of the dummy data is completed, the control proceeds to step ST4, where the sub-picture unit pointer calculation section 11 initializes the value of the next-sub-picture reproduction unit pointer.

After initialization of the value of the next-sub-picture reproduction unit pointer is completed, the control proceeds to step ST5, where the data transfer section 10 in the stream transfer control section 7 begins to transfer sub-picture data to the sub-picture buffer 13.

At step ST6, the data transfer section 10 informs the sub-picture unit pointer calculation section 11 of the data transfer length for every 1 byte of sub-picture data being transferred, and the sub-picture unit pointer calculation section 11 keeps adding the data transfer length. The addition of the data transfer length by the sub-picture unit pointer calculation section 11 is continued until the data transfer of the packet SPU1_1 is completed. At step ST7, the input selection switch 2 conducts between the terminals SW0 and SW1 as the transfer of the sub-picture packet SPU1_1 is completed.

At this point, the sub-picture buffer 13 has a state B2 as illustrated in FIG. 7. When the data transfer for the sub-picture packet SPU1_1 is completed and a next sub-picture packet SPU1_2 is input to the input processing section 1, the packet start code detection section 4 detects the sub-picture packet SPU1_2, which is informed to the reproduction unit beginning detection section 6. Thereafter, the header analysis section 5 performs a header analysts to determine the presence or absence of reproduction time information.

Since the illustrated packet SPU1_2 does not include the beginning data of the reproduction unit 110P, no reproduction time information is included in its packet header. Accordingly, the header analysis section 5 informs the reproduction unit beginning detection section 6 of the absence of reproduction time information. Based on the detection of the sub-picture packet SPU1_2 and the informed absence of reproduction time information, the reproduction unit beginning detection section 6 determines that the sub-picture packet SPU1_2 does not correspond to the beginning of the reproduction unit 110P (step ST2).

Once the header analysis is completed, the input selection switch 1 is controlled so as to conduct between the terminals SW0 and SW2. The transfer of the sub-picture packet SPU1_2 does not call for initialization of the next-sub-picture reproduction unit pointer value in the sub-picture unit pointer calculation section 11. Rather, the data transfer length is cumulatively added to the next-sub-picture reproduction unit pointer value every time the data transfer by the data transfer section 10 is completed (steps ST5, ST6, and ST7). Once the data transfer for the sub-picture packet SPU1_2 is completed, the input selection switch 1 is controlled so as to conduct between the terminals SW0 and SW1.

At this point, the sub-picture buffer 13 has a state B3 as illustrated in FIG. 7. Since an intermittent data transfer (special reproduction) is assumed in this example, sub-picture packet SPU1_3 may not be input after the completion of the transfer of the sub-picture packet SPU1_2, but the next sub-picture packet SPU2_1 may instead be input to the input processing section 1. Then, the packet start code detection section 4 detects the sub-picture packet, which is informed to the reproduction beginning detection section 6.

Thereafter, the header analysis section 5 performs a header analysts to determine the presence or absence of reproduction time information. Since the illustrated packet SPU2_1 includes the beginning data of the reproduction unit 110Q, reproduction time information is included in its packet header. Accordingly, the header analysis section 5 informs the reproduction unit beginning detection section 6 of the presence of reproduction time information. Based on the detection of the sub-picture packet SPU2_1 and the informed presence of reproduction time information, the reproduction unit beginning detection section 6 determines that the sub-picture packet SPU2_1 includes the beginning of the reproduction unit 110Q. At this point, the next-sub-picture reproduction unit pointer value which is managed by the sub-picture unit pointer calculation section 11 reflects the data length of the reproduction unit 110Q of the input sub-picture data.

Since the beginning of a sub-picture reproduction unit is being detected the second time (steps ST2 and ST8), the data transfer section 10 overwrites the next-sub-picture reproduction unit pointer value which is managed by the sub-picture unit pointer calculation section 11, so as to replace the dummy data portion which has been added to the beginning of the sub-picture packet SPU1_1 within the sub-picture buffer 13, by using the address of the dummy data within the sub-picture buffer 13 (which was stored responsive to the transferred dummy data) (ST9). At this point, the sub-picture buffer 13 has a state B4 as illustrated in FIG. 7.

In accordance with the series of control steps performed by the input processing section 1 as described above, it is possible to add the actual sub-picture reproduction unit length of the input sub-picture data to the beginning of a reproduction unit as a next-sub-picture reproduction unit pointer.

(Operation of Sub-picture Decoder)

On the assumption that sub-picture encoded data 109 is stored in the sub-picture buffer 13 from the beginning of the reproduction unit 110P, the sub-picture decoder 18 analyzes the unit header 110A in order to acquire the unit header length, the end of the encoded bit map data, and the information at the beginning of the display control information. Upon confirming based on the reproduction time information that it is time to commence reproduction, the sub-picture decoder 18 decodes the encoded bit map data 110B, adjusts the position to display the decoded bit map data, display effects, and the like, for displaying sub-picture data.

Next, the sub-picture decoding operation by using the next-sub-picture reproduction unit pointer value that has been added by the input processing section 1 will be described.

The reproduction apparatus of the present invention does not rely on a reproduction unit length which is described in a unit header that was added at the time of encoding used to reproduce sub-picture data. Rather, the reproduction apparatus of the present invention performs decoding by using a next-sub-picture reproduction unit pointer which indicates the actual reproduction unit length, the next-sub-picture reproduction unit pointer being obtained by analyzing the input sub-picture data. As a result, even if the reproduction unit length included in the beginning of a sub-picture reproduction unit is incorrect, it is possible to prevent any abnormal display operations, or suspension of sub-picture data decoding due to a hang-up, which would otherwise result from decoding incorrect display control information at the time of sub-picture data reproduction.

Figure 6:
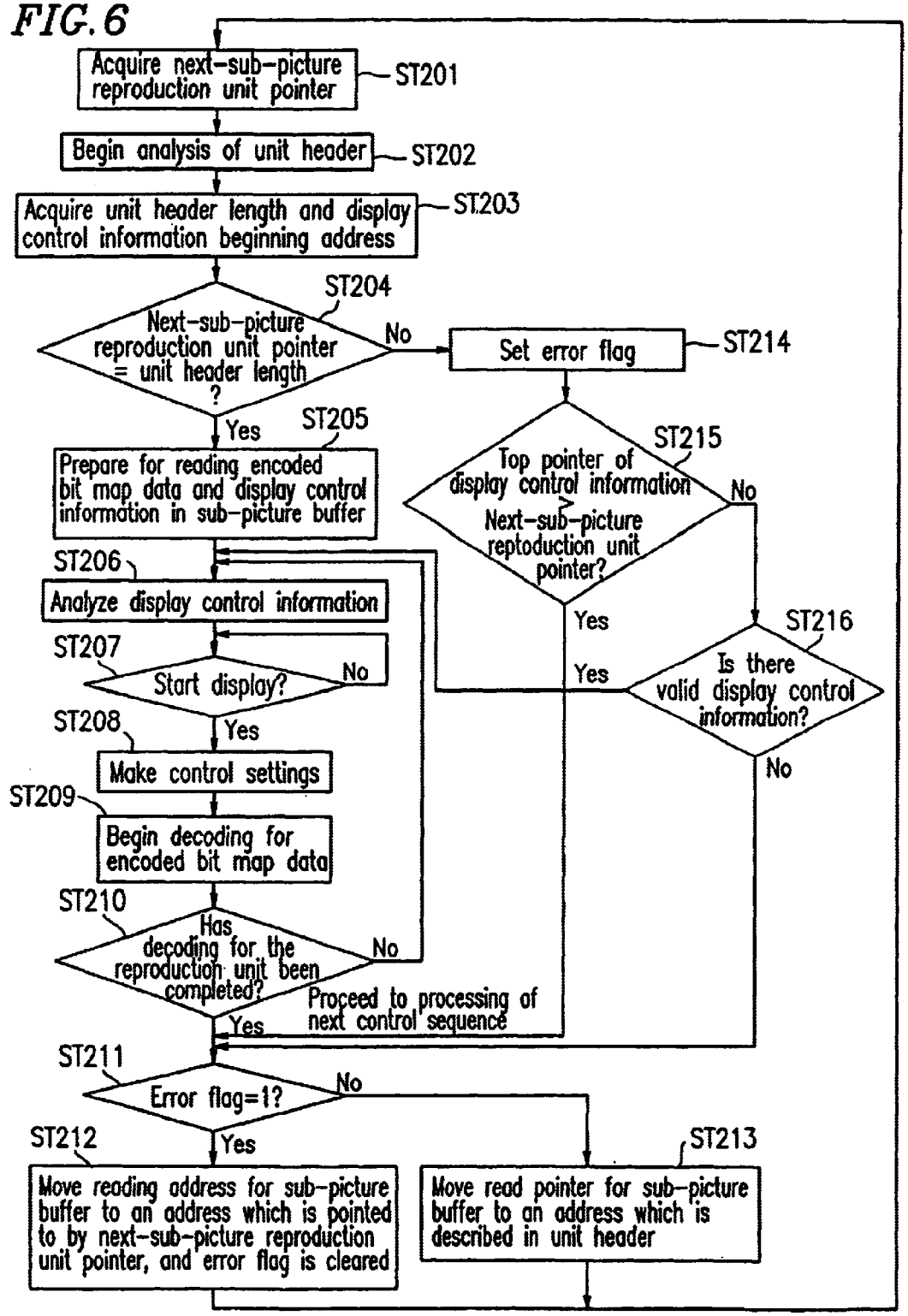
FIG. 6 is a flowchart illustrating an operation of a sub-picture decoder according to Example 1 of the present invention.

FIG. 6 is a flowchart illustrating an operation of the sub-picture decoder 18. At step ST201, the sub-picture decoder 18 reads sub-picture data which is stored in the sub-picture buffer 13, and acquires a next-sub-picture reproduction unit pointer which is located at the beginning of the sub-picture data.

Following the acquisition of a next-sub-picture reproduction unit pointer, the analysis of a next unit header is begun at steps ST201 and ST202.

At step ST203, the unit header length and the display control information beginning address are acquired through unit header analysts. Then, at step ST204, the next-sub-picture reproduction unit pointer and the unit header length are compared against each other, and the ensuing reproduction control is performed based on the comparison result. Specifically, if the next-sub-picture reproduction unit pointer is equal to the unit header length, it is determined that the entire sub-picture data that corresponds to the unit header length is stored in the sub-picture buffer 13, and the usual decoding operation is performed for the sub-picture data (i). On the other hand, if the next-sub-picture reproduction unit pointer is not equal to the unit header length, it is determined that the sub-picture data which is stored in the sub-picture buffer 13 does not correspond to the unit header length, i.e., an input data error is determined (ii).

((i) Usual Decoding Operation for Sub-picture Data)

First, the usual decoding operation for sub-picture data will be described.

At step ST205, the beginning address of the encoded bit map data 110B within the sub-picture buffer 13 and the top address of the display control information 110C are calculated on the basis of the parameters which were acquired through the aforementioned header analysis, thereby preparing for a reading operation.

At step ST206, the display control information 110C is read, and analyzed. At step ST207, it it determined whether or not to commence display based on the time information (DCSQ: display control sequence) contained in the display control information 110 and the display time information (PTS) added to the reproduction unit.

If it is decided to commence display, the display control settings are made based on the display control information 110C (step ST208), and the decoding for the sub-picture bitmap data 110B is begun (step ST209).

At step ST210, if a plurality of display control sequences are involved, it is determined whether or not all reproduction processes for the reproduction unit 110P have been completed based on the display control information 110C so as to determine the completion of reproduction of the reproduction unit 110P.

If the reproduction of the reproduction unit 110P is completed, the control proceeds to step ST211, where it is determined whether an error flag has a value "1" or not. Since no error flag is established in this case, the read pointer for the sub-picture buffer 13 is set at the beginning address of the next reproduction unit 110Q (which, in turn, is described in the unit header), and the control proceeds to a reproduction operation for the next reproduction unit 110Q (step ST213).

((ii) Decoding Operation for Sub-picture Data in the Presence of an Error)

Next, the operational flow in the case where the next-sub-picture reproduction unit pointer is not equal to the unit header length will be described. In this case, the error flag is set to "1" at step ST214.

Next, at step ST215, the value of the top pointer of the display control information 110C is compared against the value of the next-sub-picture reproduction unit pointer. If the value of the next-sub-picture reproduction unit pointer is smaller than the value of the top pointer of the display control information 110C, then none of the display control information 110C is included in the reproduction unit 110P within the sub-picture buffer 13. Therefore, upon determining the error flag being "1" (step ST211), the reading address for the sub-picture buffer 13 is set at an address which is pointed to by the next-sub-picture reproduction unit pointer, the error flag is cleared, and the control proceeds to a reproduction operation for the next reproduction unit 110Q (step ST212).

On the other hand, if the next-sub-picture reproduction unit pointer is larger than the value of the top pointer of the display control information 110C, then the display control information 110C is analyzed at step ST216 so as to determine whether or not valid display control information is contained. If valid display control information is contained, the reproduction unit 110P is reproduced based on the valid display control information (step ST206). If no valid display control information is contained, upon determining the error flag being "1" (step ST211), the reading address for the sub-picture buffer 13 is set at an address which is pointed to by the next-sub-picture reproduction unit pointer, the error flag is cleared, and the control proceeds to a reproduction operation for the next reproduction unit 110Q (step ST212).

In accordance with the decoding method by the sub-picture decoder 18 as described above, it becomes possible to prevent suspension of a decoding operation for sub-picture data that has been input in an intermittent manner, and to reproduce as much decodable portion of the input encoded data as possible.

Although the above example illustrates intermittently input data during a special reproduction mode, the present invention is not limited thereto. The reproduction apparatus according to the present invention is also applicable to data loss due to an error on a transmission path, a unit length error due to error corruption, and/or any error generated at the time of generation of a sub-picture bitstream.

Although the above example illustrates an application to sub-picture data which is compatible with the DVD standards, the present invention is also applicable to any data encoding method which is capable of restoration from errors only based on a reproduction unit length.

A video signal reproduction apparatus according to the present example is capable of skipping reproduction units in AV synchronization and skipping reproduction units during a high-speed reproduction of sub-picture data, even in the presence of errors in the data stream or in the case where data is input in an intermittent manner, by using a next-sub-picture reproduction unit pointer. It should be noted that the conventional technique of skipping reproduction units based on a reproduction unit length that is described in a unit header, rather than using a next-sub-picture reproduction unit pointer, is incapable of skipping to the beginning of a next reproduction unit when a sub-picture reproduction unit is input without being completed due to errors or intermittent data input.

Specifically, performing a skipping operation based on a reproduction unit length as in the prior art may cause a malfunctioning because, if the next sub-picture data is not stored in the sub-picture buffer 13, a portion of the previous sub-picture data may be mistakenly analyzed as the beginning of a sub-picture reproduction unit.

Figure 8:
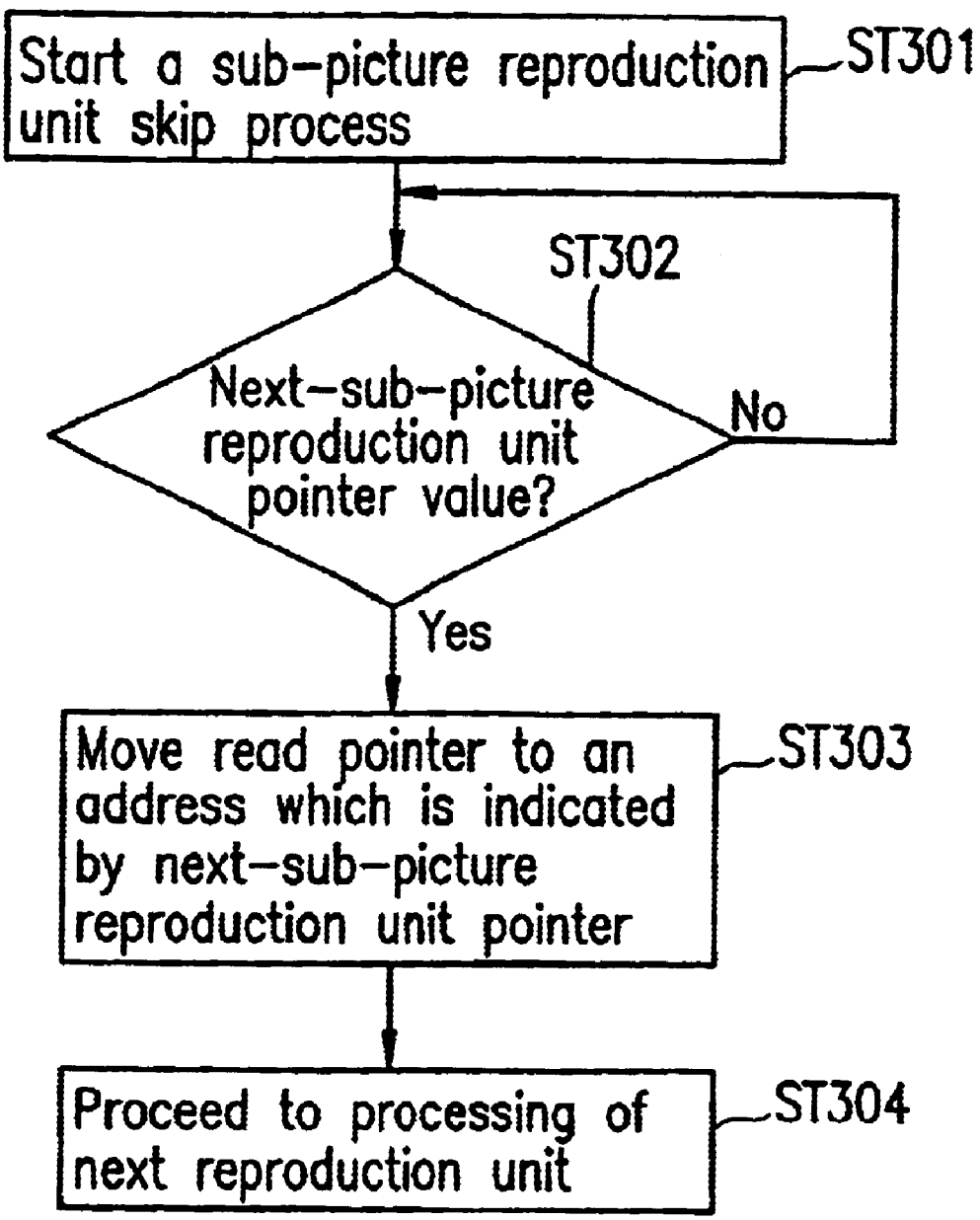
FIG. 8 is a flowchart illustrating an operation of a sub-picture decoder according to Example 1 of the present invention.

FIG. 8 is a flowchart illustrating the control flow of a skipping operation of a sub-picture reproduction unit by the sub-picture decoder section 18. When a skipping operation of a reproduction unit is started, a next-sub-picture reproduction unit pointer to be overwritten at the beginning of the next sub-picture reproduction unit 110Q is read (step ST302).

If the value of the next-sub-picture reproduction unit pointer is equal to the value of the dummy data before overwriting, no skipping is performed because the next reproduction unit 110Q has not reached the sub-picture buffer 13, and the control waits until the next-sub-picture reproduction unit pointer is overwritten over the dummy data. If the sub-picture decoder 18 determines that the next-sub-picture reproduction unit pointer value has been read, rather than a dummy data value, then skipping is performed. In this case, the read pointer is moved to an address which is indicated by the next-sub-picture reproduction unit pointer when the content of the sub-picture buffer 13 is read (step ST303), and a decoding for the next reproduction unit 110Q is performed (step ST304).

Thus, the present invention makes it possible to perform a reproduction operation while confirming the presence of an actually ensuing sub-picture data. As a result, a proper skipping operation is ensured when reproducing multiplexed encoded data in which the sub-picture data has a tendency toward underflowing.

Thus, according to the present invention, a sub-picture decoder can use the actual reproduction unit length of input sub-picture data, rather than the reproduction unit length of any sub-picture data that has been destroyed due to an error or the like. As a result, the sub-picture decoder can accurately determine whether a unit header indicates the beginning of a sub-picture reproduction unit at all times. Thus, the sub-picture decoder is prevented from being incapacitated for decoding due to an error or the like.

Furthermore, according to the present invention, a reproducible data portion in a sub-picture reproduction unit can be appropriately determined. As a result, it becomes possible to prevent inappropriate sub-picture data displaying due to decoding erroneous data while reproducing an error-ridden bitstream.

Furthermore, according to the present invention, the use of a next-sub-picture reproduction unit pointer ensures a proper skipping operation of sub-picture data.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A video signal reproduction apparatus for reproducing a multiplexed encoded stream comprising audio data, video data, sub-picture data, and additional information digitally encoded and multiplexed on a packet-by-packet basis, wherein the multiplexed encoded stream comprises a plurality of packs, each of the plurality of packs comprising at least one packet, the at least one packet comprising a packet header and packet encoded data; and wherein the packet encoded data comprises at least one of packet audio encoded data, packet video encoded data, packet sub-picture encoded data, and packet navigation encoded data;

wherein the packet audio encoded data forms sub-picture encoded data, the sub-picture encoded data comprising a first reproduction unit and a second reproduction unit;

the first reproduction unit comprising a first unit header, first encoded bit map data, and first display control information; and the second reproduction unit comprising a second unit header, second encoded bit map data, and second display control information, wherein the video signal reproduction apparatus comprises:

an input processing section for adding a next-sub-picture reproduction unit pointer to the first reproduction unit; and a sub-picture decoder for decoding the sub-picture encoded data based on the next-sub-picture reproduction unit pointer added to the first reproduction unit.

2. A video signal reproduction apparatus according to claim 1, wherein the input processing section adds the next-sub-picture reproduction unit pointer to the beginning of the first reproduction unit.

3. A video signal reproduction apparatus according to claim 1, wherein the input processing section adds the next-sub-picture reproduction unit pointer immediately after the first unit header.

4. A video signal reproduction apparatus according to claim 1, wherein the input processing section comprises:

a stream separation section for detecting the beginning of the first reproduction unit; and a stream transfer control section for adding dummy data to the first reproduction unit.

5. A video signal reproduction apparatus according to claim 4, wherein the stream transfer control section comprises:

a dummy data insertion section for adding the dummy data to the first reproduction unit;

a data transfer section for transferring the first reproduction unit, to which the dummy data has been added; and an input reproduction unit length measuring section for counting the number of data in the first reproduction unit which has been transferred by the data transfer section, wherein the data transfer section overwrites the next-sub-picture reproduction unit pointer to replace the dummy data based on the number of data as counted by the input reproduction unit length measuring section.

6. A video signal reproduction apparatus according to claim 1, further comprising a sub-picture buffer for storing the first reproduction unit, to which the next-sub-picture reproduction unit pointer has been added by the input processing section, wherein the sub-picture decoder decodes the sub-picture encoded data stored in the sub-picture buffer.

7. A video signal reproduction method for reproducing a bitstream comprising audio data, video data, sub-picture data, and additional information digitally encoded and multiplexed on a packet-by-packet basis, wherein the multiplexed encoded stream comprises a plurality of packs, each of the plurality of packs comprising at least one packet, the at least one packet comprising a packet header and packet encoded data; and wherein the packet encoded data comprises at least one of packet audio encoded data, packet video encoded data, packet sub-picture encoded data, and packet navigation encoded data;

wherein the packet audio encoded data forms sub-picture encoded data, the sub-picture encoded data comprising a first reproduction unit and a second reproduction unit down stream from the first reproduction unit;

the first reproduction unit comprising a first unit header, first encoded bit map data, and first display control information; and the second reproduction unit comprising a second unit header, second encoded bit map data, and second display control information, wherein the method comprises:

a first step of adding a next-sub-picture reproduction unit pointer to the first reproduction unit; and a second step of decoding the sub-picture encoded data by using the next-sub-picture reproduction unit pointer.

8. A video signal reproduction method according to claim 7, wherein the first step comprises adding the next-sub-picture reproduction unit pointer to the beginning of the first reproduction unit.

9. A video signal reproduction method according to claim 7, wherein the first step comprises adding the next-sub-picture reproduction unit pointer immediately after the first unit header.

10. A video signal reproduction method according to claim 7, wherein the first step comprises adding the next-sub-picture reproduction unit pointer to the first reproduction unit during a special reproduction mode involving intermittent data input.

11. A video signal reproduction method according to claim 7, wherein the first unit header contains a unit header length representing a reproduction unit length which is added when the packet sub-picture encoded data is encoded, and the second step comprises using the next-sub-picture reproduction unit pointer with a priority over the unit header length.

12. A video signal reproduction method according to claim 11, wherein the second step comprises:

determining an input data error in a case where the next-sub-picture reproduction unit pointer does not coincide with the unit header length, and decoding the second reproduction unit by detecting the beginning of the second reproduction unit by using the next-sub-picture reproduction unit pointer.

13. A video signal reproduction method according to claim 7, wherein the second step comprises skipping to the second reproduction unit based on the next-sub-picture reproduction unit pointer.

14. A video signal reproduction method according to claim 7, wherein the second step comprises, in a case where the first display control information includes valid first display control information, decoding the first reproduction unit based on the valid first display control information.

* * * * *